US007062037B2

(12) United States Patent
Chan et al.

(10) Patent No.: US 7,062,037 B2
(45) Date of Patent: Jun. 13, 2006

(54) GENERIC LINE IMPEDANCE MATCHING CIRCUIT USING DECOMPOSED CONFIGURABLE TRANSFER FUNCTIONS

(75) Inventors: Wing K. Chan, Allen, TX (US); Joseph T. Nabicht, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 409 days.

(21) Appl. No.: 10/137,160

(22) Filed: Apr. 30, 2002

(65) Prior Publication Data

US 2003/0202653 A1    Oct. 30, 2003

(51) Int. Cl.
*H04M 1/00* (2006.01)
*H04M 9/00* (2006.01)

(52) U.S. Cl. ............ 379/394; 379/399.01; 379/399.02; 379/400

(58) Field of Classification Search ............... 379/394, 379/398, 399.01, 399.02, 402, 387.01, 387.02, 379/395, 400
See application file for complete search history.

(56) References Cited

U.S. PATENT DOCUMENTS

| | | | | |
|---|---|---|---|---|
| 4,386,430 A | * | 5/1983 | Treiber | 375/232 |
| 4,796,296 A | | 1/1989 | Amada et al. | |
| 5,253,291 A | * | 10/1993 | Naseer et al. | 379/406.06 |
| 5,583,934 A | * | 12/1996 | Zhou | 379/399.02 |
| 5,974,363 A | * | 10/1999 | Gammel et al. | 702/117 |
| 6,275,581 B1 | * | 8/2001 | Fischer et al. | 379/398 |
| 6,625,278 B1 | * | 9/2003 | Hendricks et al. | 379/398 |
| 6,728,370 B1 | * | 4/2004 | Anderson et al. | 379/398 |
| 6,735,302 B1 | * | 5/2004 | Caine et al. | 379/405 |
| 2002/0067824 A1 | * | 6/2002 | Wang | 379/406.06 |
| 2002/0118819 A1 | * | 8/2002 | Li | 379/399.01 |

FOREIGN PATENT DOCUMENTS

WO      WO 88 10539 A    12/1988

OTHER PUBLICATIONS

ITU-T Recommendation Q.552, "Switching and Signalling", Nov. 1966.
ITU-T Recommendation G.712, "Transmission Systems and Media, Digital systems and Networks", Nov. 1996.
Harris Semiconductor, "Operational Description and Modeling of the RSLIC18 AC Loop", Sep. 1998.
AMD ISLAC Specification, "Quad Intelligent Subscriber Line Audio-Processing Circuit (ISLAC)", Feb. 1999.
Infineon SICOF14-µC Product Overview, Feb. 2001.

* cited by examiner

*Primary Examiner*—Quochien B. Vuong
*Assistant Examiner*—Tuan Pham
(74) *Attorney, Agent, or Firm*—Abdul Zindani; W. James Brady, III; Frederick J. Telecky, Jr.

(57) ABSTRACT

A technique for implementing impedance matching circuits 100 that use the transfer functions of each line impedance model. This technique allows implementation of an impedance match for a diverse number of line impedances reusing the same circuit 100 topology, by simply adjusting coefficients to accommodate different line impedances.

18 Claims, 1 Drawing Sheet

GENERIC LINE IMPEDANCE MATCHING CIRCUIT USING DECOMPOSED CONFIGURABLE TRANSFER FUNCTIONS

BACKGROUND OF THE INVENTION

1. Field of the Invention

This invention relates generally to subscriber line interface circuits, and more particularly, to a generic line impedance matching circuit using decomposed configurable transfer functions.

2. Description of the Prior Art

Impedance matching is a very important function of any equipment that is attached to copper twisted pairs. A line-matched impedance helps control reflections and echoes in the line which then helps maintain good quality of service.

Previous impedance matching functions have been performed using hybrid transformers and a discrete matching impedance, and more recently, using Subscriber Line Interface Circuits (SLICs) with op-amps and a discrete matching feedback impedance. These methods have required large discrete components and large amounts of board space. The large number of different standardized line impedances (more than 24), and the need for custom line impedance matching make the design of a generic integrated impedance matching circuit very difficult and costly. A traditional SLIC implementation is illustrated in FIG. 1(a). The SLIC 10 provides the Tip and Ring function as well as the sense function required to perform an impedance match at the Tip Ring via the impedance matching op-amp network 20. This traditional implementation necessitates the requirement for a new op-amp network 20 for each different line impedance. The traditional op-amp impedance matching circuit (network) 20 can be represented as a transfer function given by H(S) as depicted in FIG. 1(b).

In view of the foregoing, it would be desirable and advantageous to provide a simple and inexpensive scheme to reuse the same circuit topology for implementing an impedance match for a diverse number of line impedances.

SUMMARY OF THE INVENTION

Impedance matching in the digital domain has been limited to slower sampling digital implementations requiring external discrete resistors, and/or multiple stages of complex digital filtering. These known implementations have a very limited range with regard to gain and filter functions that limits the range of impedance matching. Some known impedance matching (IM) implementations have a combinational analog/digital approach with the digital portion itself decomposed into two to three decimated loops following an ADC, imposing even higher delays in the IM path.

The present invention is directed to a technique for implementing impedance matching circuits that uses the transfer functions of each line impedance model. This technique allows implementation of an impedance match for a diverse number of line impedances reusing the same circuit topology, by simply adjusting coefficients to accommodate different line impedances.

In one aspect of the invention, a generic impedance matching circuit is implemented using decomposed configurable transfer functions.

In another aspect of the invention, a generic impedance matching circuit is implemented to perform impedance matching for a variety of line impedance models and allow integration into the digital core.

In yet another aspect of the invention, a generic impedance matching circuit is provided by decomposing a matching function into its base transfer functions and implementing as either simple analog gain and/or a digital transfer function.

In still another aspect of the invention, a generic impedance matching circuit is provided by representing the reactive components of a line impedance as a transfer function in the digital domain, and then processing the matching signal in the digital domain to eliminate the need for a large discrete capacitor.

In still another aspect of the invention, a generic impedance matching circuit is provided to support all International Telecommunication Union, ITU-T line impedance models, by allowing for custom impedance matching models using the same circuit.

In still another aspect of the invention, a generic impedance matching circuit is implemented using separate analog impedance matching gain and impedance matching filter elements to alleviate the need for a faster sampling clock as compared to an all-digital solution.

One embodiment of the invention is directed to a line impedance matching circuit comprising no more than one analog path having an output, and no more than one digital path having an output, wherein the no more than one analog path output and the no more than one digital path output are selectively summed to provide impedance matching associated with a plurality of subscriber line interfaces.

Another embodiment of the invention is directed to a line impedance matching circuit comprising a circuit having an analog path and a digital path, wherein the analog path and the digital path are combined to selectively provide a plurality of decomposed configurable transfer functions selected from the group consisting of a simple analog gain, and a digital domain transfer function.

Still another embodiment of the invention is directed to a method of impedance matching comprising the steps of providing a generic line impedance matching circuit comprising a circuit having an analog path and a digital path, wherein the analog path and the digital path are combined to selectively provide a plurality of decomposed configurable transfer functions; and selecting transfer function coefficients to provide an impedance match associated with a prescribed subscriber line.

BRIEF DESCRIPTION OF THE DRAWINGS

Other aspects, features and advantages of the present invention will be readily appreciated, as the invention becomes better understood by reference to the following detailed description, when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Four distinct types of transfer functions exist for the ITU-T prescribed line impedances. These prescribed line impedances are made up of a combination of a resistor Rs in series with a resistor Rp in parallel with a capacitor Cp. The final impedance match must account for the case where protection resistors Rprot are used just before the input to the SLIC, by subtracting the resistance of the protection resistors from the series resistor Rs. The four distinct types of transfer functions are set forth below as Cases 1–4, wherein the ± is dependent upon various SLIC specifications.

Case 1:

$$Z = Rs, \text{resistive case only}, Hg$$

$$H(S) = \pm \frac{Rs - 2Rprot}{Rin}$$

Case 2:

$$Z = Rx + Cp, \text{resistor in series with a capacitor}, Hg + Hf(S)$$

$$H(S) = \pm \left[ \frac{Rs - 2Rprot}{Rin} + \frac{1}{RinCpS} \right]$$

Case 3:

$$Z = Rs + Rp \mathbin{/\mkern-6mu/} Cp, \text{resistor in series with parallel resistor}$$
$$\text{and capacitor}, Hg + Hf(S)$$

$$H(S) = \pm \left[ \frac{Rs - 2Rprot}{Rin} + \frac{Rp}{Rin(RpCpS + 1)} \right]$$

Case 4:

$$Z = Rp \mathbin{/\mkern-6mu/} Cp, \text{no series resistor, parallel resistor and capacitor}, Hf(S)$$

$$H(S) = \pm \left[ \frac{Rp}{Rin(RpCpS + 1)} \right]$$

The foregoing transfer functions can be separated into a gain part Hg, and a frequency dependent part Hf(S). The frequency dependent parts have an S-domain transfer function that belongs to a family of b/(S+a) low pass functions. These S-domain transfer functions can be implemented in the digital Z-domain by performing a bilinear transform represented by $$Hf(S) \Rightarrow Hf(Z) = \frac{A_0 + A_1 Z^{-1}}{B_0 - B_1 Z^{-1}}$$

Figure 1A:
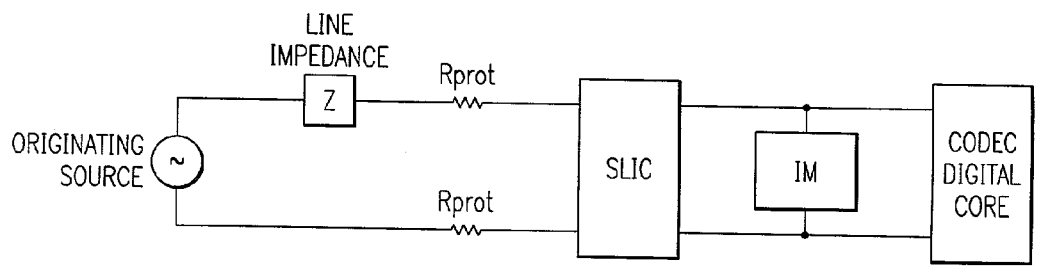
FIGS. 1(a) and 1(b) illustrate an impedance matching technique commonly associated with Subscriber Line Interface Circuits.
Figure 1B:
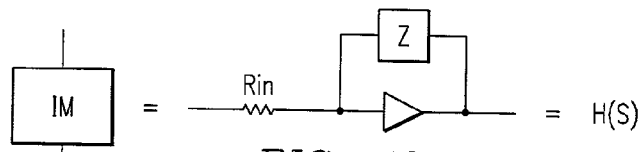
Figure 2:
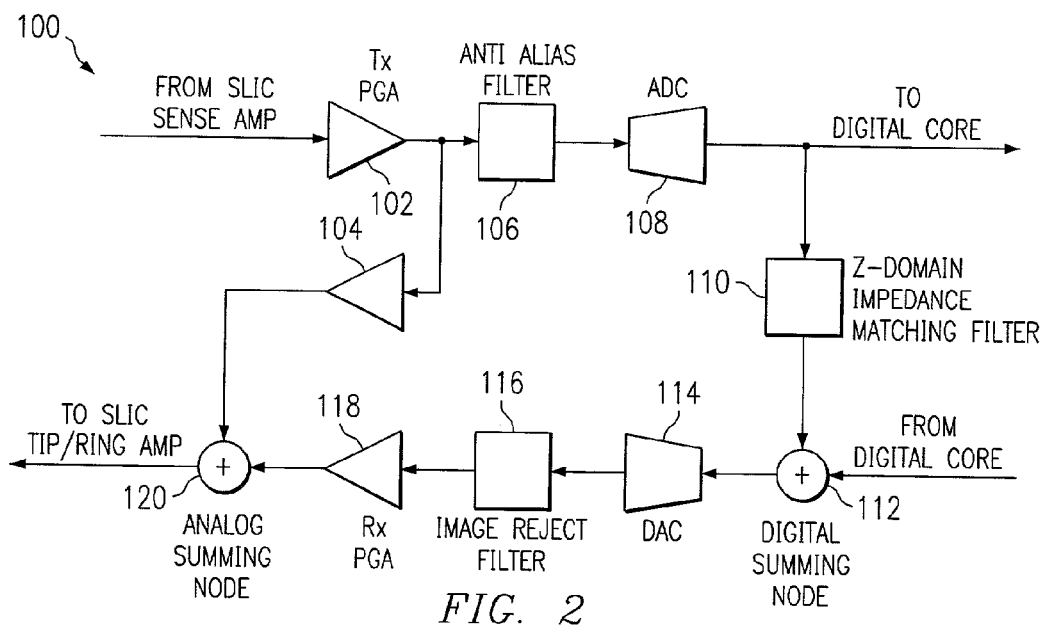
FIG. 2 illustrates an impedance matching technique for use with Subscriber Line Interface Circuits according to one embodiment of the present invention.

FIG. 2 is a block diagram illustrating a final implementation of an impedance matching circuit 100 for use with Subscriber Line Interface Circuits according to one embodiment of the present invention. Circuit 100 can be seen to include a transmit programmable gain amplifier, transmit programmable gain amplifier (Tx PGA) 102, Impedance Matching Gain 104, an Anti-Alias Filter (AAF) 106, an analog-to-digital converter (ADC) 108, a Z-Domain Impedance Matching Filter 110, a Digital Summing Node 112, a digital-to-analog converter (DAC) 114, an Image Reject Filter (IRF) 116, a receive programmable gain amplifier (RxPGA) 118, and an Analog Summing Node 120.

The gain portion Hg of the transfer functions discussed herein before will be implemented by a combination of the TxPGA 102 and the Impedance Matching Gain block 104. The frequency dependent portion Hf(S) will be implemented by a combination of the TxPGA 102, the AAF 106, ADC 108, the Z-Domain Impedance Matching Filter 110, DAC 114, IRF 116, and the RxPGA 118. Although settings for the filters 106, 110, 116 and gain stages 102, 104, 118 can be set to any arbitrary value, finite values must be chosen to reflect real line impedances and implementations to correctly emulate the H(S) function. The gain component Hg and frequency dependent component Hf(S) portions of the transfer functions emulated via impedance matching circuit 100 are now discussed herein below with reference to cases 1–4 described above.

Case 1:

H(S) is just a gain component and does not have any frequency dependent components. In this case, only the Impedance Matching Gain block 104 is used. The Z-Domain Impedance Matching Filter 110 is not used and can be disconnected. The gain through TxPGA 102 and the Impedance Matching Gain block 104 must then be equivalent to the required Hg.

Case 2 and Case 3:

H(S) is comprised of a gain portion Hg and a low pass portion Hf(S). The Hg portion must be accounted for using TxPGA 102 and the Impedance Matching Gain block 104 such as done in Case 1 discussed above. The Hf(S) function must be implemented by cascading TxPGA 102, AAF 106, ADC 108, the Z-Domain Impedance Matching Filter 110, Digital Summing Node 112, DAC 114, IRF 116 and RxPGA 118. The Hf(S) function frequency dependency generally will be implemented by the Z-Domain Impedance Matching Filter 110; but the overall gain will be accounted for in frequency responses will be accounted for in the frequency responses determined by TxPGA 102, AAF 106, ADC 108, the Z-Domain Impedance Matching Filter 110, Digital Summing Node 112, DAC 114, IRF 116 and RxPGA 118. The overall response then is represented as H(S)=Hg+Hf(S) as discussed herein before.

Case 4:

H(S) is simply the low pass function Hf(S). Hg is not required; and therefore, the Impedance Matching Gain block 104 can now be disconnected. Hf(S) will then be implemented by the cascaded responses of TxPGA 102, AAF 106, ADC 108, the Z-Domain Impedance Matching Filter 110, Digital Summing Node 112, DAC 114, IRF 116 and RxPGA 118.

In summary explanation, the implementations discussed above with reference to Cases 1–4 are generally equivalent to H(S) within some prescribed mismatch in amplitude and phase, and so offer a viable solution for implementing a generic line impedance matching circuit using decomposed configurable transfer functions.

Impedance matching in the digital domain has historically been implemented using slower sampling techniques requiring external discrete resistors, and/or multiple stages of complex digital filtering resulting. These known impedance matching implementations have a very limited range regarding gain and filter functions, negatively affecting the range of impedance matching. Some know impedance matching implementations have a combinational analog/digital approach with the digital portion itself decomposed into two to three decimated loops following the ADC, imposing even higher delays in the impedance matching path.

Design Considerations:

The deciding factor when designing for impedance matching is the Return Loss (RL). Return Loss is usually defined as the −10 log of the reflection factor $\rho_r$. Zr is the termination impedance; and Zo is the incident impedance. The reflection factor then is $$\rho_r = \frac{Zr - Zo}{Zr + Z0}, \text{ and the Return Loss is}$$

$$RL = -10\log\left(\frac{|Zr - Zo|}{|Zr + Zo|}\right)^2$$

For a perfectly matched system, the reflection factor is 0; and the Return Loss in infinite, such that $$\rho_r = \frac{Vr - Vo}{Vr + Vo}, \text{ and}$$

$$RL = -10\log\left(\frac{|Vr - Vo|}{|Vr + Vo|}\right)^2,$$

i.e. there is no reflection. The reflection factor may also be expressed as a ratio of the incident voltage Vo and the reflected voltage Vr.

One primary concern when designing an impedance matching circuit is to maximize the Return Loss by minimizing the amplitude and phase distortions caused by the impedance matching circuit. The voltage Return Loss equation clearly shows that a difference in the voltage Vo across the incident impedance and the termination impedance (reflected) Vr, directly affects the Return Loss. It can also be shown that the Return Loss is dependent on the phase difference between the incident Vo and the termination Vr.

$$\rho_r = \frac{Vr - Vo}{Vr + Vo} = \frac{1 - 1\angle 0}{1 + 1\angle 0} = \frac{1 - (\cos\theta + j\sin\theta)}{(1 + (\cos\theta + j\sin\theta))} = \frac{Re(1 - \cos\theta) + Im(\sin\theta)}{Re(1 + \cos\theta) + Im(\sin\theta)}$$

It is also possible to look at the magnitude of the reflection factor to determine Return Loss.

$$\text{Magnitude}^2 = Re^2 + Im^2$$

$$RL = -10\log\left(\frac{(1 - \cos\theta)^2 + \sin^2\theta}{(1 + \cos\theta)^2 + \sin^2\theta}\right) =$$

$$-10\log\left(\frac{1 - \cos\theta}{1 + \cos\theta}\right) - 10\log\left(\frac{\sin^2\theta}{\cos^2\theta}\right)$$

$$RL = -10\log\left(\tan^2\frac{\theta}{2}\right)$$

The Return Loss can be affected by a phase difference between the incident and reflected voltages, which translates to a reactive difference in the line impedance and the matching impedance. There will be a specific phase difference for a given Return Loss. Intuitively, this angle will translate to different delays for different frequencies, longer delays at lower frequencies and shorter delays at higher frequencies. For this reason, among others, the present inventors split the impedance matching circuit 100 into two parts, an analog Impedance Matching Gain, Hg function, and a digital Z-domain Impedance Matching filter. The low frequency response of Hf(S) can be implemented in the low frequency digital core; while the wideband gain stage Hg is implemented in the analog process. The present inventors realized that a completely digital impedance matching scheme would require a much faster digital core (codec with less delays) to ensure that the overall group delay was minimal and did not adversely affect Return Loss. The amplitude and phase variation must therefore be kept to a minimum on all components to ensure an effective impedance matching circuit.

The impedance matching circuit 100 discussed above with reference to FIG. 2 is an entirely integrated solution that is capable of matching all ITU-T country impedances; and also allows for custom line impedance matching. The impedance matching circuit 100 employs a faster ADC to reduce the digital processing delays, and a simple 1$^{st}$ order low-pass Z-Domain IIR filter 110 in the digital domain, summed to an analog gain path. Those skilled in the art will readily appreciate this single analog path, single digital path solution is simpler to use and program than previous realizations with comparable performance.

In view of the above, it can be seen the present invention presents a significant advancement in the art of line impedance matching circuits and systems. In view of the foregoing descriptions, it should be apparent that the present invention also represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A line impedance matching circuit comprising:
   no more than one analog path having an output; and
   no more than one digital path having an output, wherein the no more than one analog path output and the no more than one digital path output are selectively summed to provide impedance matching associated with a plurality of subscriber line interfaces.

2. The line impedance matching circuit according to claim 1 wherein the line impedance matching circuit is devoid of external op-amps to provide the impedance matching.

3. The line impedance matching circuit according to claim 1 wherein the line impedance matching circuit is devoid of discrete matching feedback circuits to provide the impedance matching.

4. The line impedance matching circuit according to claim 1 wherein the line impedance matching circuit is devoid of discrete large capacitors.

5. The line impedance matching circuit according to claim 1 wherein the no more than one digital path comprises:
   a transmit programmable gain amplifier (PGA) having an output;
   an anti-alias filter (AAF) having an output and further having an input in communication with the PGA output;
   an ADC having an output and further having an input in communication with the AAF output;
   a Z-domain impedance matching filter having an output and further having an input in communication with the ADC output;
   a digital summing node having an output and further having an input in communication with the Z-domain impedance matching filter output;
   a DAC having an output and further having an input in communication with the digital summing node output;

an image reject filter (IRF) having an output and further having an input in communication with the DAC output;

a receive PGA having an output and further having an input in communication with the IRF output; and a analog summing node having an output, a first input and a second input, wherein the first input is in communication with the no more than one analog path, and further wherein the second input is in communication with the receive PGA output.

6. The line impedance matching circuit according to claim 1 wherein the no more than one analog path output and the no more than one digital path output are summed to selectively provide a plurality of impedance matching transfer functions selected from the group consisting of $$H(S) = \pm \frac{Rs - 2Rprot}{Rin}, H(S) = \pm \left[\frac{Rs - 2Rprot}{Rin} + \frac{1}{RinCpS}\right],$$

$$H(S) = \pm \left[\frac{Rs - 2Rprot}{Rin} + \frac{Rp}{Rin(RpCpS + 1)}\right], \text{ and}$$

$$H(S) = \pm \left[\frac{Rp}{Rin(RpCpS + 1)}\right],$$

wherein Rs is a resistor in series with a resistor Rp in parallel with a capacitor Cp associated with a subscriber line impedance and Rprot represents any protection resistors at the input of a subscriber line interface circuit.

7. A line impedance matching circuit comprising a circuit having an analog path and a digital path, wherein the analog path and the digital path are combined to selectively provide a plurality of decomposed configurable transfer functions selected from the group consisting of a simple analog gain, and a digital domain transfer function.

8. The line impedance matching circuit according to claim 7 wherein the decomposed configurable transfer functions are defined by $$H(S) = \pm \frac{Rs - 2Rprot}{Rin},$$

$$H(S) = \pm \left[\frac{Rs - 2Rprot}{Rin} + \frac{1}{RinCpS}\right],$$

$$H(S) = \pm \left[\frac{Rs - 2Rprot}{Rin} + \frac{Rp}{Rin(RpCpS + 1)}\right], \text{ and}$$

$$H(S) = \pm \left[\frac{Rp}{Rin(RpCpS + 1)}\right],$$

wherein Rs is a resistor in series with a resistor Rp in parallel with a capacitor Cp associated with a subscriber line impedance and Rprot represents any protection resistors at the input of a subscriber line interface circuit.

9. The line impedance matching circuit according to claim 7 wherein the line impedance matching circuit is devoid of external op-amps to provide impedance matching.

10. The line impedance matching circuit according to claim 7 wherein the line impedance matching circuit is devoid of discrete matching feedback circuits to provide impedance matching.

11. The line impedance matching circuit according to claim 7 wherein the line impedance matching circuit is devoid of discrete large capacitors to provide impedance matching.

12. The line impedance matching circuit according to claim 7 wherein the analog path is the sole analog path and the digital path is the sole digital path.

13. The line impedance matching circuit according to claim 7 wherein the digital path comprises:

a transmit programmable gain amplifier (PGA) having an output;

an anti-alias filter (AAF) having an output and further having an input in communication with the PGA output;

an ADC having an output and further having an input in communication with the AAF output;

a Z-domain impedance matching filter having an output and further having an input in communication with the ADC output;

a digital summing node having an output and further having an input in communication with the Z-domain impedance matching filter output;

a DAC having an output and further having an input in communication with the digital summing node output;

an image reject filter (IRF) having an output and further having an input in communication with the DAC output;

a receive PGA having an output and further having an input in communication with the IRF output; and a analog summing node having an output, a first input and a second input, wherein the first input is in communication with the analog path, and further wherein the second input is in communication with the receive PGA output.

14. A method of impedance matching comprising the steps of:

providing a generic line impedance matching circuit comprising a circuit having an analog path and a digital path, wherein the analog path and the digital path are combined to selectively provide a plurality of decomposed configurable transfer functions; and selecting transfer function coefficients to provide an impedance match associated with a prescribed subscriber line.

15. The method according to claim 14 wherein the step of selecting transfer function coefficients comprises selecting transfer function coefficients associated with a transfer function defined by the relationship $$H(S) = \pm \frac{Rs - 2Rprot}{Rin},$$

wherein Rs is a series resistor associated with a subscriber line impedance and Rprot represents any protection resistors at the input of a subscriber line interface circuit.

16. The method according to claim 14 wherein the step of selecting transfer function coefficients comprises selecting transfer function coefficients associated with a transfer function defined by the relationship $$H(S) = \pm \left[\frac{Rs - 2Rprot}{Rin} + \frac{1}{RinCpS}\right],$$

wherein Rs is a resistor in series with a resistor Rp in parallel with a capacitor Cp associated with a subscriber line impedance and Rprot represents any protection resistors at the input of a subscriber line interface circuit.

17. The method according to claim 14 wherein the step of selecting transfer function coefficients comprises selecting transfer function coefficients associated with a transfer function defined by the relationship $$H(S) = \pm \left[ \frac{Rs - 2Rprot}{Rin} + \frac{Rp}{Rin(RpCpS + 1)} \right],$$

wherein Rs is a resistor in series with a resistor Rp in parallel with a capacitor Cp associated with a subscriber line impedance and Rprot represents any protection resistors at the input of a subscriber line interface circuit.

18. The method according to claim 14 wherein the step of selecting transfer function coefficients comprises selecting transfer function coefficients associated with a transfer function defined by the relationship $$H(S) = \pm \left[ \frac{Rp}{Rin(RpCpS + 1)} \right],$$

wherein Rp is a resistor in parallel with a capacitor Cp associated with a subscriber line impedance.

* * * * *